United States Patent [19]

Templeton

[11] 4,015,701
[45] Apr. 5, 1977

[54] APPARATUS FOR DRIVING A DOCUMENT THROUGH AN ENCODER STATION

[75] Inventor: William B. Templeton, Howell, Mich.

[73] Assignee: Burroughs Corporation, Detroit, Mich.

[22] Filed: Aug. 28, 1975

[21] Appl. No.: 608,567

[52] U.S. Cl. .......................... 197/127 R; 271/270; 271/266; 101/91; 101/91;287;232;233;234
[51] Int. Cl.² ......................................... B41J 13/00
[58] Field of Search ............ 197/127 R, 133 R, 19; 271/270, 266, 272, 273, 274

[56] References Cited
UNITED STATES PATENTS

| | | | |
|---|---|---|---|
| 2,996,166 | 8/1961 | Bradshaw et al. | 271/266 X |
| 3,239,216 | 3/1966 | Pfleger | 271/266 |
| 3,508,637 | 4/1970 | Hull et al. | 197/133 R |
| 3,524,528 | 8/1970 | Peyton | 197/133 R |
| 3,618,738 | 11/1971 | Boyatt et al. | 197/127 R X |
| 3,907,282 | 9/1975 | Hunter | 271/266 X |

Primary Examiner—Edward M. Coven
Attorney, Agent, or Firm—Robert C. J. Tuttle; Leon E. Redman; Kevin R. Peterson

[57] ABSTRACT

A document encoding system transmits an incoming document at a high transport speed. When the document is received at an encoding station it is first stopped and registered and then retransmitted for encoding at a relatively low speed, the exact value being dependent on whether MICR or OCR encoding is used. After characters are encoded on the document the trailing edge is detected and the document is caused to accelerate to the high transport speed where it is transmitted for further processing.

In a second alternative embodiment, information relating to character field positions is used to transmit the document at the relatively low speed when encoding and at a heightened speed when otherwise in the encoding station but not encoding.

In a third alternative embodiment, the document is received by the encoding station on the fly at the high transport speed. It is advanced at that speed until decelerated to the relatively low speed at the first encoding position. When an end-of-encode signal is given the document is accelerated to the high transport speed and exits the station.

16 Claims, 11 Drawing Figures

APPARATUS FOR DRIVING A DOCUMENT THROUGH AN ENCODER STATION

BACKGROUND OF THE INVENTION

This invention relates generally to document transport drive systems, and more particularly to a variable speed document transport drive system for use in an encoder station to increase the system throughput.

Prior art encoder stations, such as the encoder station employed in the Burroughs S100 proof encoder system, utilized a drive system wherein the check was moved to the encoder station at 75 inches per second (ips). As soon as the document enters the encoder station at 75 ips, it is stopped when it contacts a closed pressure roller assembly and it is registered. The closed pressure roller assembly then drives the document at the encoding speed of 2½ ips for the encoding operation. When the end-of-encode signal is given, the pressure roller assembly is pulled open and the high speed drive rollers will exit the document at 75 ips. After the trailing edge of the check clears the edge sensor, the pressure roller assembly closes and is ready to stop the next incoming document. This system is relatively slow since the document is driven from its leading edge until the end of encoding at 2½ ips and the continual engagement and disengagement of the pressure roller assembly can cause mechanical failure, document damage, and the generation of excessive noise.

SUMMARY OF THE INVENTION

It is, therefore, an object of the present invention to provide an improved encoder station having a variable speed document drive means for increasing the throughput of the encoder.

It is a further object of the present invention to provide a DC servo motor system for controllably varying the speed of a document in an encoding station for increasing throughput while insuring that the document is moved at the proper speed for encoding with MICR or OCR characters to insure the proper spacing thereof.

It is still a further object of the present invention to provide an improved method and apparatus for increasing the throughput of an MICR or OCR encoder while reducing mechanical wear and noise.

It is yet a further object of the present invention to provide a phase-locked loop control system for a DC servo motor which is used to controllably vary the speed of a document in an encoding station for increasing the throughput of the encoder.

It is still a further object of the present invention to provide a variable drive system for driving a document through an encoder station such that the document is slewed to the proper printing position at a relatively high speed before being decelerated to the desired lower encoding speed and then rapidly accelerated at the end of encoding to increase the throughput of the encoder.

These and other objects and advantages of the present invention are provided in an encoding station wherein a phase-locked loop is used to control a DC servo motor for controllably varying the speed of a document in the encoder station such that the proper relatively low encoding speed is maintained to insure proper spacing of the encoded MICR or OCR characters while increasing the throughput of the system. In a first embodiment, the document is received at the encoder station at a high speed, is stopped and registered. The document is then accelerated to the relatively low desired encoding speed, and when encoding is completed, the document is rapidly accelerated to exit the encoding station. In a second embodiment, the document is received at a relatively high speed, stopped and registered. Then, if printing is to take place at the start of the document, the document will be accelerated to the relatively low desired encoding speed initially, but if printing is to take place further down the document, the DC servo motor is driven to accelerate the document to some intermediate and relatively higher speed until the proper printing position is approached. At this point, the document is decelerated down to the proper relatively low encoding speed, and when encoding is completed, the document is again rapidly accelerated to exit the encoder station. Lastly, a third embodiment is disclosed wherein the document is received into the encoder station at a relatively high speed and is not stopped at the leading edge of the document. The document enters the encoder station on-the-fly at a relatively high speed and is decelerated to the relatively low encoding speed only as the desired printing position is approached. At the end of encoding, the document is again rapidly accelerated out of the encoder station to further increase the throughput. Each of these embodiments improves the throughput of the system while reducing the chance of mechanical damage or noise.

BRIEF DESCRIPTION OF THE DRAWINGS

Other objects, advantages and features of this invention will become more fully apparent from the following detailed description, appended claims, and accompanying drawings in which like reference numerals designate corresponding parts.

DETAILED DESCRIPTION OF THE DRAWINGS

Figure 1:
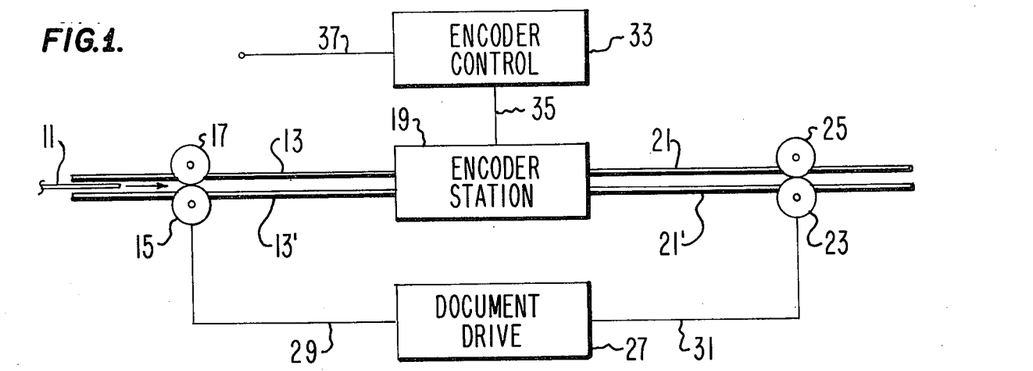
FIG. 1 illustrates a block diagram of a portion of a document processing system having an encoder station.

FIG. 1 is a block diagram of the encoder station section of a document processing system. A document 11 such as a bank check or the like is shown traveling along a document transport path defined by document transport path-defining walls 13, 13' in the direction of the arrow in front of the document 11. A drive roller assembly comprising drive roller 15 and idler roller 17, which may be a slip roller combination or the like, engages the document 11 and transports it at a relatively high speed $V_{hs}$ toward the encoder station represented by block 19. The document 11 exits the encoder station 19 and is transported along the document transport path-defining walls 21, 21' by a second drive assembly comprising drive roller 23 and idler roller 25 which again may comprise a slip roller combination as known in the art. The drive means of block 27 controls the normally high speed drive velocity of the transport system. The normal high speed drive propels the document 11 along a transport path 13, 13' into the encoder station of block 19 and away from the encoder station via the transport path 21, 21' at a relatively high normal transport velocity $V_{hs}$. This speed is maintained by the drive means of block 27 which is connected via coupling 29 to the drive roller 15 and via coupling 31 to the drive roller 23. The encoder control circuitry of block 33 is connected via coupling 35 to the encoder station of block 19 and controls the drive within the encoder station and the encoding of the document within this station. The encoder control circuitry of block 33 could receive control signals via lead 37 from the central processor unit of the document handling system, from external controls, or the like.

Figure 2:
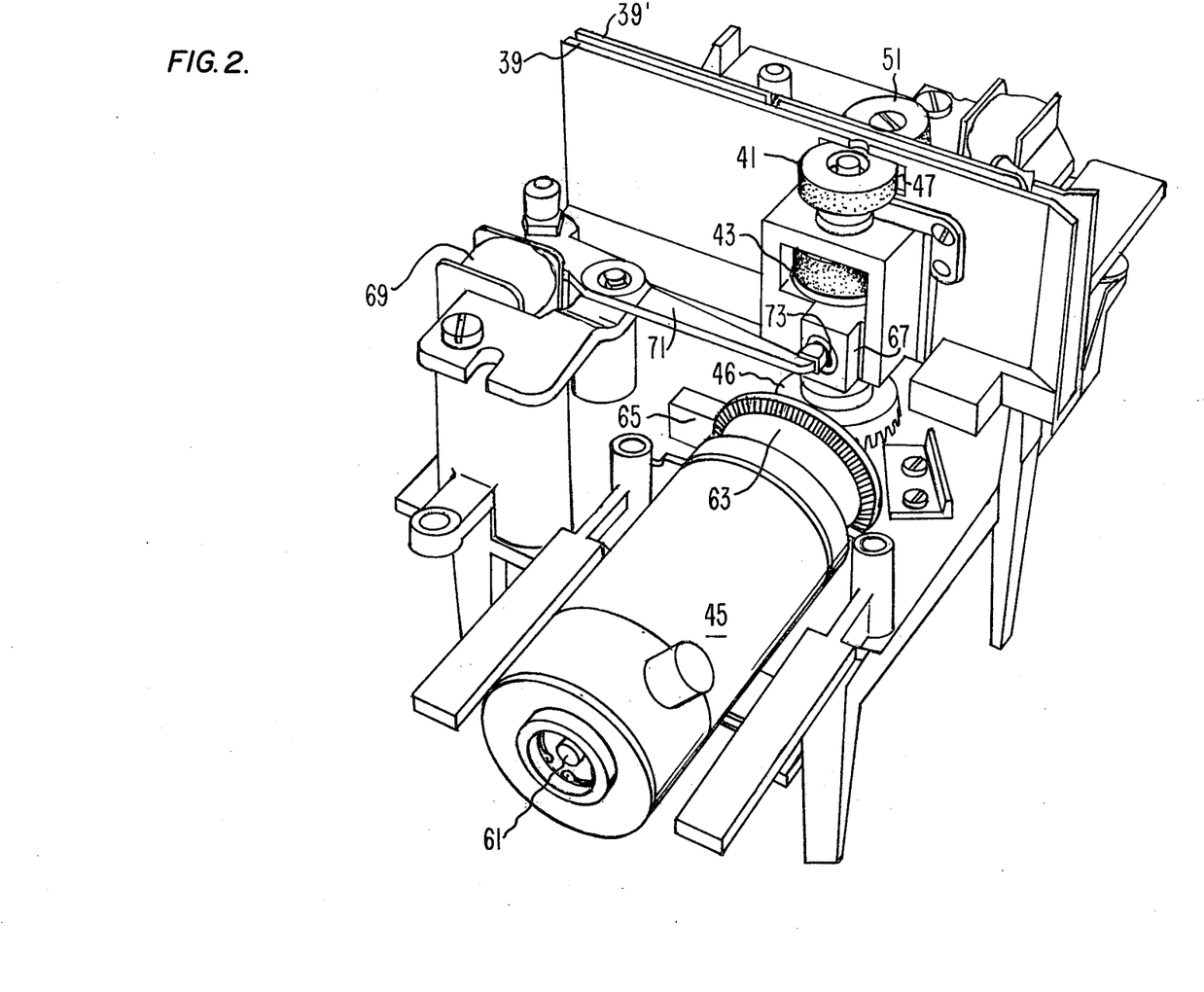
FIG. 2 is a perspective view of the encoder station of the present invention.
Figure 3:
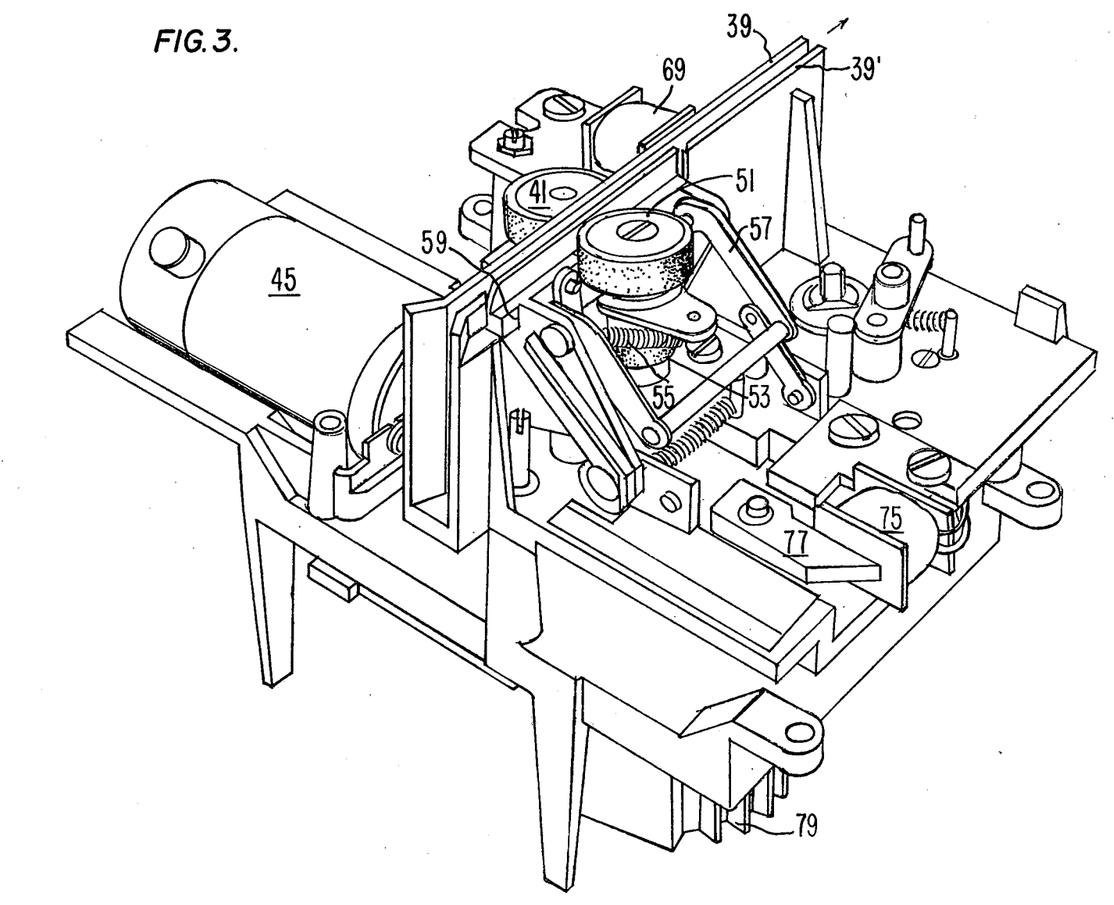
FIG. 3 is another perspective view of the encoder station of the present invention.

FIGS. 2 and 3 illustrate two different perspective views of the encoder station of block 19 of the present invention. The document transport path of the encoder station of FIGS. 2 and 3 is formed by document transport path-defining walls 39 and 39' of the encoder station. The encoder station drive roller assembly comprises a pair of drive rollers including an upper drive roller 41 and a lower drive roller 43 which are driven by a DC servo motor 45 via some intercoupling means or gearing arrangement known in the art but not shown in the drawing. The upper drive roller 41 extend into the encoder station document transport path via an aperture 47 in the document transport path-defining wall 39 and the lower drive roller 43 similarly extends into the encoder station document transport path via a second aperture in the document transport path-defining wall 39 which is not shown in the drawing. Similarly, a pair of idler rollers including an upper idler roller 51 and a lower idler roller 53 are positioned in opposed relationship to the upper and lower drive rollers 41 and 43 and extend into the document transport path via similar apertures in the document transport path-defining wall 39' as previously described. The document 11 is engaged between the drive rollers 41, 43 and the idler rollers 51, 53 and driven at a velocity determined by the DC servo motor 45 through the encoder station. It will be observed that the idler roller assembly comprising rollers 51 and 53 are biased into contact with the drive rollers 41, 43 respectively via spring 55 whenever the toggle assembly 57 is locked into place. The toggle assembly 57 may be unlocked to move the idler roller assembly 59 which houses the idler rollers 51 and 53 away from the document transport path-defining wall 39' to facilitate the insertion of an inked ribbon past the printing station. Attached to the shaft 61 of the DC servo motor 45 and secured thereto is a slotted timing disk 63 which may contain, for example, 250 slots which are used for feedback purposes. An LED photo-detector assembly 65 is positioned with respect to the slots of the slotted disk 63 so as to generate electrical timing or positional signals as each of the slots of the slotted disk 63 go past the LED photodetector assembly 65. The printing station 67 of the encoder of FIGS. 2 and 3 is located immediately below the pair of drive rollers 41, 43 and idler rollers 51, 53 within the document transport path defined by walls 39, 39'. The hammer asembly includes a print hammer solenoid 69 which is energizable to move a striker arm to impel a hammer 73 which is located immediately below the drive rollers 41, 43 toward the document 11 within the transport path defined by walls 39, 39'. The hammer 73 will contact the document and cause the encode wheel which is located below the idler rollers 51, 53 and not shown in the drawings but well known in the art, to encode a character on the document 11 located within the document transport path defined by walls 39, 39'. An encode wheel detent solenoid 75 is located behind the toggle assembly 57 and may be used to position an encode wheel detent arm 77 as known in the art. The encode wheel may be driven by a stepper motor 79 under the control of the central processor unit or the encoder control circuitry of block 33 of FIG. 1 to insure that the encode wheel is properly positioned at the print station for encoding on the document 11.

Figure 4:
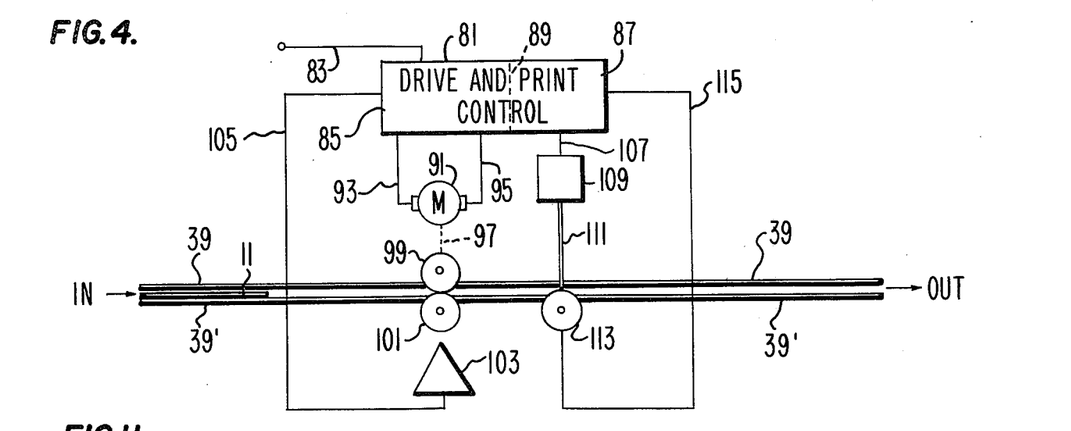
FIG. 4 illustrates a block diagram of the electrical aspects of the encoder station of the present invention.

FIG. 4 illustrates a block diagram of the electrical system of the encode station of FIGS. 2 and 3, and for illustrative purposes only, the drive assembly and the print station have been shown as being located at different positions along the track, whereas it is clear from FIGS. 2 and 3 that the positions are, in actuality, spaced along a single vertical axis. The drive and print control circuitry of the encoder station is shown as being enclosed within the block 81. This block may, for example, receive signals from a central processor unit, from external control sources, or from a programmed memory or the like via lead 83. The drive and print control circuitry of block 81 is shown as being divided into a drive control portion 85 and a print control porition 87 via dotted line 89. Drive signals are supplied from the drive control portion 85 to the DC servo motor 91 via lead 93 and feedback information is supplied back to the drive control section 85 of block 81 via lead 95. The DC servo motor 91 is coupled via coupling 97 and used to control the speed of document drive roller 99 as known in the art. Idler roller 101 is positioned in cooperative relationship with the drive roller 99 so as to engage the document 11 being inputted to the encoder station and drive it in the direction of the arrow between the encode station walls 39, 39' so as to control the speed of the document 11 through the encoder station of FIG. 4. A document sensor or edge detector 103 supplies information as to the presence or absence of a document at the drive roller 99 idler roller 101 sensing position and transmits this information via lead 105 back to the drive control portion 85 of the control circuitry of block 81. When the drive control circuitry has accelerated or decelerated the document 11 to the proper encoding speed $V_{ls}$, the print control portion 87 will send a print signal over lead 107 to the print hammer actuator of block 109 and cause the hammer 111 to strike the document 11 against the encode wheel 113 when the document is in the proper printing position. The positioning of the encode wheel may be controlled, as known in the art, from signals supplied from the print section 87 via lead 115.

The method of operation of the various embodiments of the present invention will now be described with reference to FIGS. 1 and 4. In a first embodiment of the present invention, the document 11 is transported via the drive roller 15 idler roller 17 assembly under the control of the normal transport drive means of block 27 toward the encoder station of block 19 at a relatively high normal transport speed $V_{hs}$ which may be, for example, 75 inches per second (ips). As the document 11 enters the encoder station of block 19 and passes into the encoder station document transport path defined by walls 39, 39', it is brought to a stop when it contacts the stop drive roller 99 and idler roller 101 combination. The document 11 is registered as having arrived at the drive roller 99 idler roller 101 position by the document sensor 103 and a signal indicative thereof is sent back via lead 105 to the drive control section 85 of block 81. The drive control section 85 will drive the DC servo motor 91 so as to cause the drive roller 99 to transport the document 11 at the desired encoding speed $V_{ls}$, which may be, for example, 3 1/8 ips for encoding with MICR or 2 1/2 ips for encoding with OCR. The document will be driven at $V_{ls}$ past an encoding station comprising an encode wheel 113 and a hammer 111. At the encoding station, the print control portion 87 of block 81 controls the positioning of the encode wheel 113 via a signal transmitted thereto over lead 115. When the document 11 is in the proper encoding position between the hammer 111 and the encode wheel 113, the print control portion 87 of block 81 sends a signal on lead 107 to the hammer actuator asembly 109 causing a hammer solenoid or the like to fire the hammer 111 to strike the document 11 against the encode wheel 113 so as to cause the proper character to be encoded thereon. The document then proceeds out of the encode station in the direction of the arrow shown between the document transport path defining walls 39, 39'.

Figure 5:
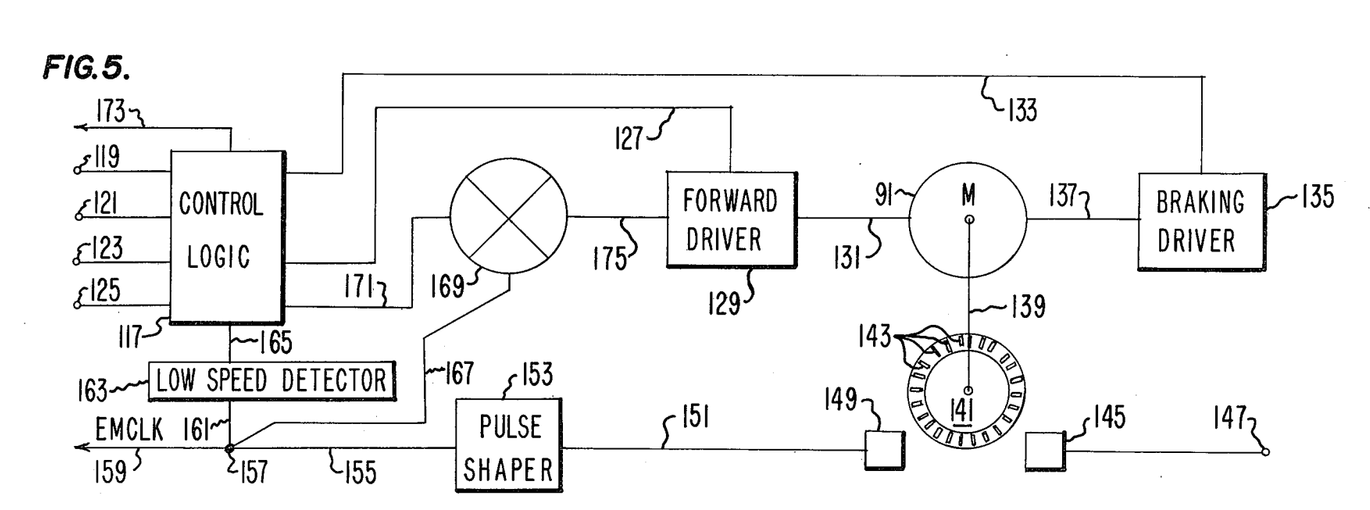
FIG. 5 illustrates a block diagram of the encoder document drive control system of the present invention.

FIG. 5 illustrates a block diagram of the encoder document drive control system of the present invention. Referring to FIG. 5, the control logic of block 117 receives various signals from the central processor or the like and outputs various control signals. Input 119 receives a signal from the processor indicating that high speed operation is desired and input 121 receives a signal from the processor indicating that low speed operation is desired. Input lead 123 serves to input information as to the number of columns of slew which is required and input 125 receives one speed reference signal for MICR operation and a second speed reference signal for OCR operation. A first output to the control logic of block 117 is supplied via lead 127 to the forward driver circuitry of block 129. The forward driver circuitry of block 129 is coupled to the DC servo motor 91 via lead 131 and supplies forward drive current thereto. A second output to the control logic of block 117 is supplied via lead 133 to the braking or reverse drive circuitry of block 135 and this circuit is used to supply reverse drive current to the motor 91 via lead 137. The shaft of the DC servo motor 91 is connected via coupling 139 to a slotted disk 141 having a plurality of apertures or slots 143 about the periphery thereof. The slotted disk 141 may be, for example, a 250 slot optical tachometer disk which allows for a four to five relationship of reference frequencies so that if the speed of the DC motor 91 were 120 rpm's for MICR and 96 rpm's for OCR, the tachometer disk 141 would generate 400 pulses per second for OCR operation and 500 pulses per second for MICR operation. This alleviates the need to change the timing disk 141 between MICR and OCR operation. If the DC servo motor 91 is geared to the document drive roll 99 of FIG. 4 through a 2 to 1 ratio, the motor speed of 120 rpm's for MICR operation establishes a document feed rate of 1.125 inches per second for MICR and the motor speed of 96 rpm's for OCR operation establishes a document feed rate of 2.5 characters per second for OCR operation. This insures proper character spacing regardless of whether MICR or OCR is used and it will be observed that the distance traveled by the document between succesive slots 143 of the timing disk 141 and hence between two successive timing pulses represents .00625 inches of document movement regardless of the motor speed.

A light source 145, such as a light emitting diode or the like, may be powered from some source of potential via input lead 147. The light from the light emitting diode 145 is detected as it passes through a slot 143 of the timing disk 141 by a phototransistor 149 or some comparable type of photodetector. The signal from the phototransistor 149 is supplied via lead 151 to the pulse shaper circuitry of block 153 and the shaped output pulses are supplied via lead 155 to node 157. Node 157 is used as a source of the clock pulses EMCLK which are taken via lead 159, and is also connected via lead 161 to the input of the low speed detector circuit of block 163 whose output is connected via lead 165 to another input of the control logic of block 117. The shaped timing pulses from node 157 are also supplied via lead 167 to one input of the phase/frequency discriminator 169. Another input to the phase/frequency discriminator 169 is supplied via lead 171 from a third output of the control logic of block 117 and a fourth output is taken via lead 173 and used to supply the motor stop signal to inform the processor that the DC servo motor 91 has stopped and is awaiting the arrival of another document. The output of the phase/frequency discriminator 169 is supplied via lead 175 to the forward driver circuitry of block 129 and establishes a phase-locked loop to control the DC servo motor 91 so as to accurately position the document during the encoding operation.

The document is transmitted at a relatively low speed $V_{ls}$ while encoding takes place but is rapidly accelerated to a relatively high speed such as 75 ips for a rapid ejection from the encoding station after encoding has been completed. This results in greatly increased throughput since the document need not exit from the encoding station after the last character has been encoded thereon at the relatively low encoding speed $V_{ls}$.

As indicated in FIG. 4, the leading edge of the document 11 is sensed when it arrives at the position of detector 103. From that point on the pulses from the slotted disk 141 are shaped and then counted to determine when the first print position in which a character is to be encoded has been reached. Information as to the first character to be printed on the document is supplied to the encoder station from the external processor as otherwise known in the art. After the last character has been encoded on the document, the processor informs the control logic of block 117 and the DC servo motor 91 is allowed to rapidly accelerate to its maximum speed $V_{hs}$. No attempt at precision speed control is made while operating in the high speed mode. After the document has left the encoder station, machine timing considerations require that the DC servo motor 91 be stopped within a short time such as 120 milliseconds after the trailing edge of the document 11 has exited the detector station 103. Regular dynamic braking is insufficient to meet this requirement and thus electrical braking is used. During the electrical braking phase of operation, the voltage across the DC servo motor 91 is reversed causing it to attempt to turn in the opposite direction, thereby resulting in rapid deceleration of the motor 91. When the speed of the motor, as indicated by the frequency of the timing pulses outputted from phototransistor 149, has fallen below a predetermined value, the low speed detector circuitry of block 163 indicates to the control logic of block 117 that low speed has been attained, thereby allowing the control logic of block 117 to remove the application of reverse motor current, thereby preventing the motor from actually going into reverse direction.

In the second embodiment of the invention disclosed herein, information as to the number of columns which may be skipped before encoding is to take place on the document is supplied via lead 123 to the control logic of block 117. Motor drive is controlled so that after the document is stopped and registered at the detector 103 of FIG. 4, it is rapidly accelerated to some intermediate speed and perhaps even to $V_{hs}$, and then decelerated to the required encoding speed $V_{ls}$ as the required printing position is approached. After encoding is completed, the end-of-encode signal is generated and the document is again rapidly accelerated to exit the encoder station as previously described.

In the third embodiment disclosed herein, slew information is supplied via lead 123 to the control logic of block 117 and the DC servo motor 91 is initially driven at the relatively high speed $V_{hs}$ as the document enters the encoder station on-the-fly. The document is then decelerated to the proper encoding speed $V_{ls}$ as the desired printing position is approached, and when the end-of-encode signal is given, the document is again rapidly accelerated to exit the encoding station, resulting in even greater throughput for the system.

Figure 6:
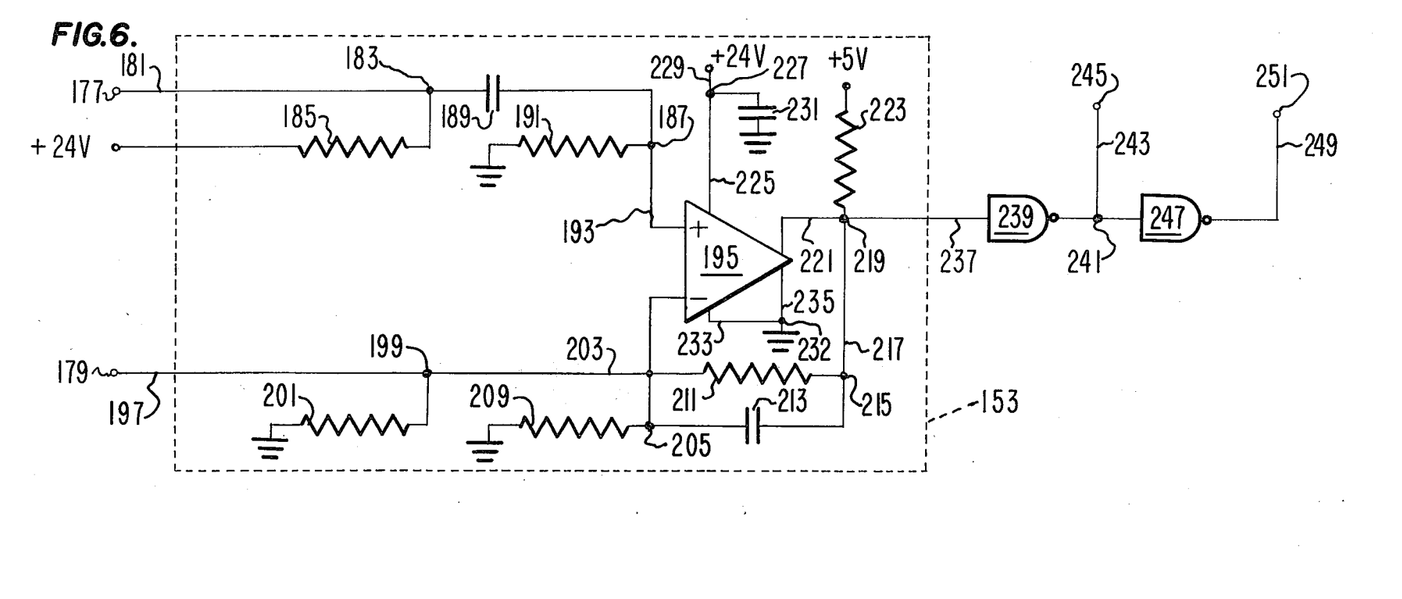
FIG. 6 is a schematic diagram of the pulse shaper of block 153 of FIG. 5.

FIG. 6 is a schematic diagram of the pulse shaper circuit of block 153 of FIG. 5. Inputs 177 and 179 are coupled to two of the electrodes of the phototransistor 149 as known in the art. Input 177 is connected via lead 181 to node 183. Node 183 is coupled to a +24 volt source of potential through a resistor 185 and is further coupled to a node 187 through a capacitor 189. Node 187 is connected to ground through a resistor 191 and is further connected via lead 193 to the positive input of a comparator 195. Input terminal 179 is connected via lead 197 to a node 199. Node 199 is resistively coupled to ground through a resistor 201 and is further connected via lead 203 to a negative comparator input node 205. Node 205 is connected via lead 207 to the negative cmparator input of comparator 195. Node 205 is also resistively coupled to ground through a resistor 209 and is coupled through the parallel combination of a resistor 211 and a capacitor 213 to a node 215. Node 215 is connected via lead 217 to the comparator output node 219 which is connected to the output of comparator 195 via lead 221. Comparator output node 219 is also connected to a +5 volt source of potential through a resistor 223. Additionally, the positive supply input of comparator 195 is connected via lead 225 to a positive supply input node 227. Node 227 is directly connected to a +24 volt source of potential through lead 229 and is capacitively coupled to ground through a capacitor 231. The negative power supply input to comparator 195 is connected directly to ground node 232 via lead 233 and the negative output terminal is connected to ground node 232 via lead 235. The comparator output node 219 is connected via lead 237 to the single input of a NAND gate 239 which serves as an inverter. The output of NAND gate 239 is taken from node 241 which is connected via lead 243 to a first pulse shaper output terminal 245. Node 241 is also connected directly to the single input of a second inverting NAND gate 247 whose output is connected via lead 249 to a second pulse shaper output terminal 251.

The input terminals 177 and 179 are connected to the phototransistor 149 of FIG. 5 and operate to generate a stream of shaped digital pulses at the output node 219. One pulse is generated for each slot 143 in the timing disk 141 and these pulses may be inverted or reinverted by subsequent NAND gates 239 and 247 respectively to provide the correct polarity of signal for use elsewhere in the circuit.

As indicated hereinabove, after the encoder station drive control 85 receives a signal from the processor indicating that the last character has been encoded, the DC drive motor 91 is rapidly accelerated to its high speed state $V_{hs}$. After the document exits the encoder station, the motor 91 must be braked to a stop to await the next incoming document. Since the DC servo motor must go from a relatively high speed to a stop in a short period of time, electrical braking is utilized. This involves reversing the voltage so as to cause the motor 91 to attempt to drive in the reverse direction.

If this reverse voltage condition were maintained, the DC servo motor 91 would eventually begin to run in the opposite direction. Since the optical tachometer comprising the timing disk 141 and the light source-photodetector combination 145, 149 provide only speed information and no information as to direction, the control logic cannot determine when the motor has stopped. In order to circumvent this problem, the speed of the DC servo motor 91 is monitored and when it drops below a certain predetermined value, braking is terminated and the motor drive voltages are restored to their initial polarities. The circuit of FIG. 7 is a schematic diagram of the low speed detector of block 163 and accomplishes this function.

Figure 7:
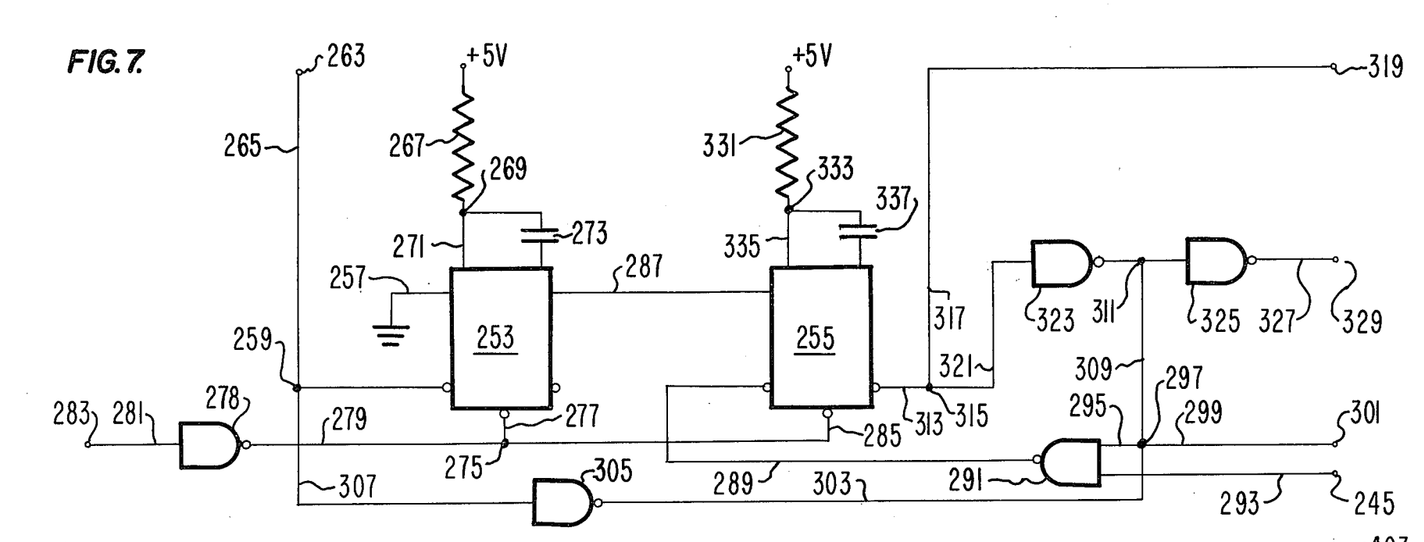
FIG. 7 is a schematic diagram of the low speed detector of block 163 of FIG. 5.

The circuit of FIG. 7 utilizes first and second single shot multivibrators 253 and 255 respectively, which may be, for example, standard TTL9602 dual retriggerable resettable monostable or one-shot multivibrators, as known in the art. The non-inverting input of one-shot 253 is connected directly to ground via lead 257 and the inverting input is connected to input node 259 via lead 261. Input node 259 is connected to the high speed drive signal input terminal 263 via lead 265. A delay-establishing network is connected to the first and second delay establishing inputs as follows.

A resistor 267 is coupled between a delay-establishing input node 269 and a +5 volt source of potential. The delay-establishing node 269 is connected directly to the first delay-establishing input via lead 271 and is capacitively coupled to the second delay-establishing input via capacitor 273. The reset or clear input to the one-shot 253 is taken from node 275 via lead 277. Node 275 is connected to the output of an inverting NAND gate 277 via lead 279. The single input of NAND gate 277 is connected via lead 281 to the low speed drive signal terminal 283. Node 275 is also connected via lead 285 to the reset or clear input of the second one-shot 255. The non-inverting output of the first one-shot 253 is connected via lead 287 to the non-inverting input of the second one-shot 255, and the inverting input of one-shot 255 is connected via lead 289 to the output of a NAND gate 291. One input of NAND gate 291 is taken via lead 293 from the first pulse shaper output terminal 245 of the circuit of FIG. 6. The second input of NAND gate 291 is connected via lead 295 to a detector output node 297 which is connected via lead 299 to a first low speed detector output teminal 301. Node 297 is also connected via lead 303 to the output of a NAND gate 305 whose single input is connected via lead 307 to node 259. Node 297 is further connected via lead 309 to a node 311. The inverting output of one-shot 255 is connected via lead 313 to a second low speed detector output node 315 which is connected via lead 317 to a second low speed detector output terminal 319 and via lead 321 to the single input of a NAND gate 323 whose output is connected directly to the node 311. Node 311 also serves as the single input to a subsequent NAND gate 325 whose output is connected via lead 327 to a third low speed detector output terminal 329. The time delay of one-shot 255 is established by a time delay-establishing network comprising a resistor 331 which is connected between a +5 volt source of potential and a delay-establishing node 333. The delay-establishing node 333 is connected via lead 335 to the first delay-establishing input of one-shot 255 and is capacitively coupled to the second delay-establishing input of one-shot 255 through a capacitor 337.

The operation of the circuit of FIG. 7 is substantially as follows. The high speed drive signal at input terminal 263 is high during the high speed drive operation and braking is initiated at the termination of high speed drive. When high speed drive is terminated, the signal at input terminal 263 goes low causing the first one-shot or single shot 253 to emit a narrow pulse beginning on the negative transition of the high speed drive a signal from terminal 263. The second single shot 255 is triggered on the leading edge of the positive transition of the narrow pulse which is outputted from the first single shot 253. The output of the second single shot is taken from node 315, and when the second single shot 255 is triggered, it will cause a reversal of the voltage applied to the DC servo motor 91 thereby causing the rapid deceleration of the motor. When the second single shot 255 is in the triggered state, NAND gate 291 is enabled. The time constant of single shot 255 is so chosen by the selection of the values of resistor 331 and capacitor 337 that it will continue to be retriggered on the positive-going edge of signal EMCLK from the low speed detector output terminal 245 as the DC servo motor 91 is slowed. When the rate of generation of the pulse EMCLK becomes less than the time constant of the second single shot 255, it reverts to its quiescent state, thereby disabling NAND gate 291 and removing the reverse voltage from the motor via circuitry to be described hereinafter. The time constant of the second single shot 255 is chosen so as to be approximately twice the time between successive EMCLK pulses at the low speed document feed rate so as to cause disablement when the speed of the servo motor 91 slows to approximately one-half of its normal speed.

Figure 8:
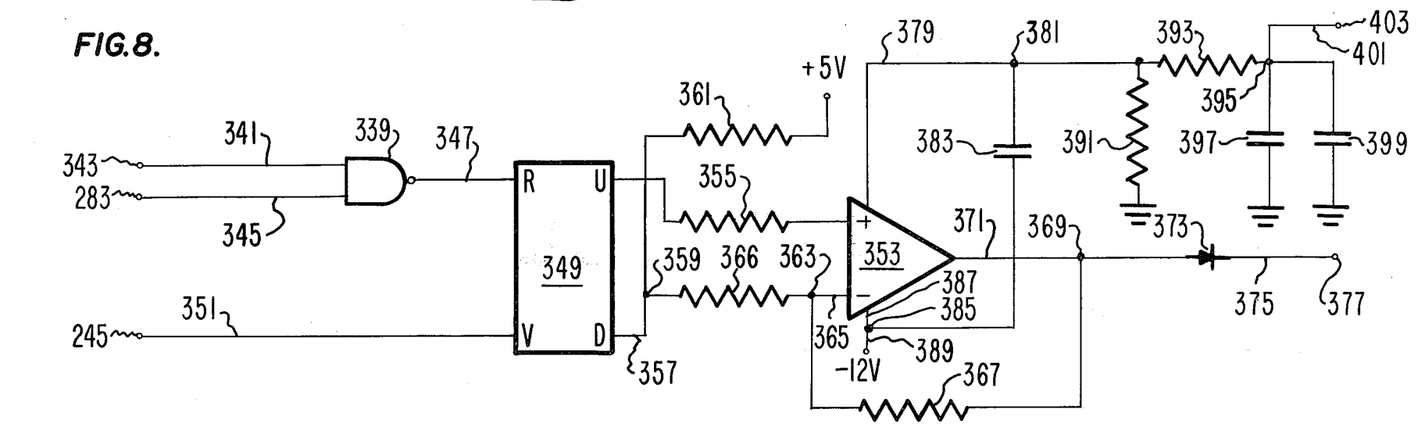
FIG. 8 is a schematic diagram of the phase and frequency discriminator of block 169 of FIG. 5.

The phase and frequency discriminator portion of the phase-locked loop of the present invention, which represents the circuitry embodied within block 169 of FIG. 5, is described with reference to FIG. 8. NAND gate 339 has one input connected via lead 341 to the motor clock reference terminal 343 and its second input connected via lead 345 to the low speed drive signal input terminal 283. The output of NAND gate 339 is connected via lead 347 to the firsst or R input of the phase discriminator 349 which may be, for example, a standard TTL MC344/4044 phase/frequency discriminator as known in the art. The second or V input of the phase discriminator 349 is taken via lead 351 from input terminal 245. The first or U output of the phase discriminator 249 is connected to the positive input of a differential amplifier 353 through a first comparator input resistor 355 and the second or D output of phase discriminator 349 is connected via lead 357 to output node 359. Output node 359 is connected to a +5 volt source of potential through a resistor 361 and is connected to a negative comparator input node 363 through a second comparator input resistor 365. The negative comparator input node 363 is connected to the negative input of comparator 355 via lead 365 and is also connected through a resistor 367 to a differential amplifier output node 369. Output node 369 is connected to the output of the differential amplifier 353 via lead 371 and to the anode of a diode 373 whose cathode is connected via lead 375 to a differential amplifier output terimal 377. The positive supply input terminal of differential amplifier 355 is connected via lead 379 to node 381. Node 381 is connected through a capacitor 383 to the negative supply input node 385. The negative supply input node 385 is connected directly via lead 387 to the negative supply input terminal of the differential amplifier 353 and via lead 389 to a −12 volt source of potential. Node 381 is also connected to ground through a resistor 391 and through a resistor 393 to a node 395. Node 395 is capacitively coupled to ground through the parallel combination of capacitors 397 and 399 and is further connected via lead 401 to a second differential amplifier output terminal 403. This circuit performs the phase and frequency discriminator portion of the phase-locked loop of the present invention and functions as any known phase and frequency discriminator of the prior art.

Figure 9:
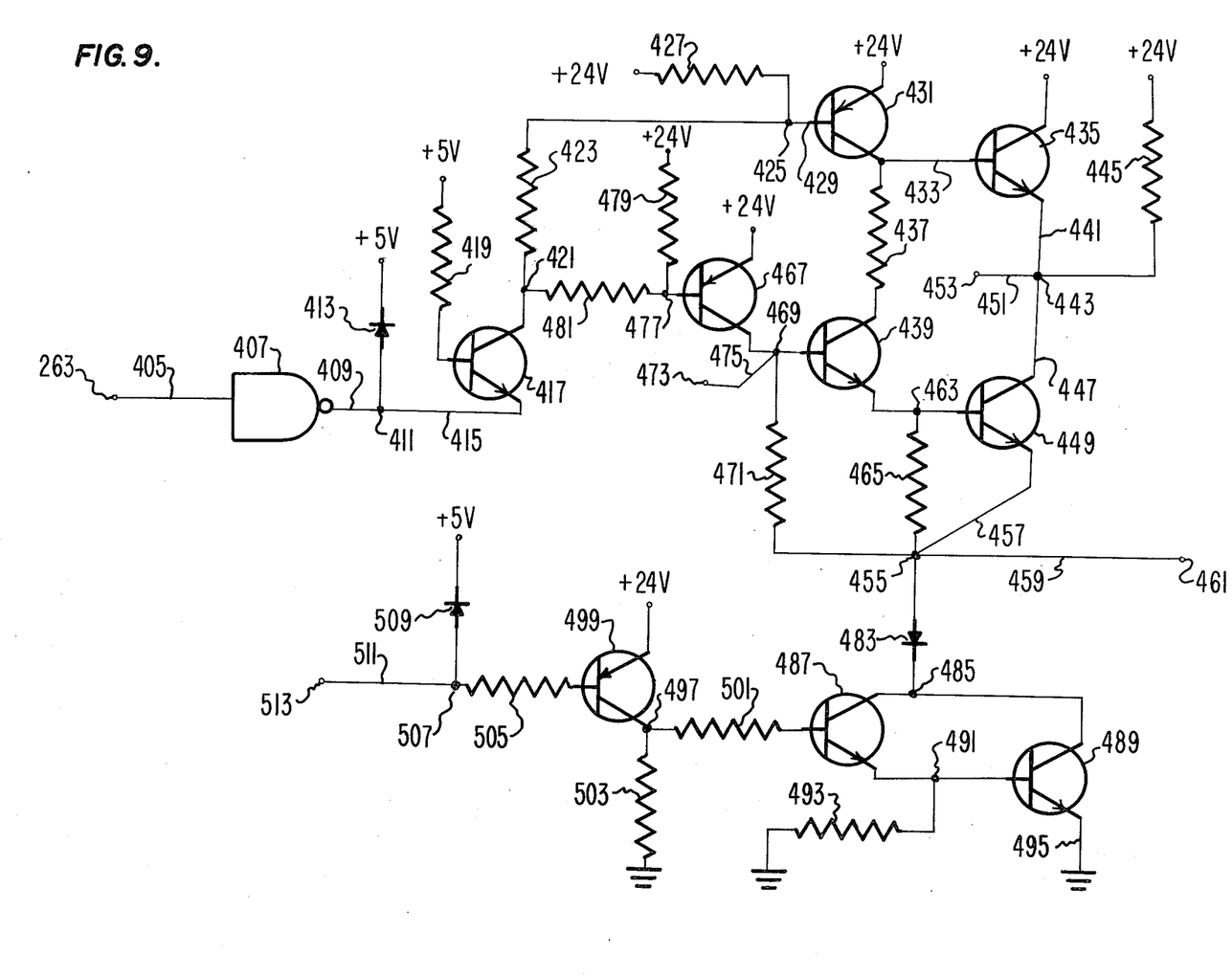
FIG. 9 is a schematic diagram of the forward driver of block 129 of FIG. 5.

FIG. 9 is a schematic diagram of the forward driver circuitry of block 129 of FIG. 5 of the present invention. The high speed drive input signal input of an inverting NAND gate 407 whose output is connected via lead 409 to node 411. Node 411 is connected to the anode of a diode 413 whose cathode is connected directly to a +5 volt source of potential, and node 411 is also connected via lead 415 to the emitter of a transistor 417. The base of transistor 417 is connected to a +5 volt source of potential through a base resistor 419 and the collector of transistor 417 is connected directly to node 421. Node 421 is connected through a resistor 423 to node 425. Node 425 is connected through a resistor 427 to a +24 volt source of drive potential and is further connected through a lead 429 to the base of a drive transistor 431. The emitter of the drive transistor 431 is connected directly to a +24 volt source of drive potential and the collector is coupled via lead 433 to the base of a second drive transistor 435 and via resistor 437 to the collector of a third drive transistor 439. The collector of drive transistor 435 is connected directly to a +24 volt source of drive potential and the emitter is connected via lead 441 to node 443. Node 443 is connected through a resistor 445 to the +24 volt source of drive potential and via lead 447 to the collector of a fourth drive transistor 449. Node 443 is also connected via lead 451 to a first drive terminal 453. The emitter of the fourth drive transistor 449 is connected to a second output node 455 via lead 457 and output node 455 is connected via lead 459 to the second drive terminal 461. The base of transistor 449 is connected to the emitter of the third drive transistor 439 via coupling node 463. Node 463 is further coupled to the output node 455 through a resistor 465. The base of the third drive transistor 439 is connected directly to the collector of transistor 467 via coupling node 469. Node 469 is connected to output node 455 through a resistor 471 and is connected to terminal 473 via lead 475. The emitter of transistor 467 is connected directly to the +24 volt source of potential and the base is connected directly to node 477. Node 477 is connected to the +24 volt source of potential through a resistor 479 and to node 421 at the collector of transistor 417 via resistor 481. Output node 455 is coupled to a grounding network as described hereinafter. Node 455 is connected to the anode of a diode 483 whose cathode is connected directly to node 485. Node 485 is connected directly to the collector of a pair of grounding transistors 487 and 489. The emitter of the first grounding transistor 487 is connected directly to node 491 and node 491 is coupled directly to the base of the second grounding transistor 489, and via a resistor 493 to ground. The emitter of transistor 489 is coupled directly to ground via lead 495, and the base of transistor 487 is connected to the collector output node 497 of a transistor 499 via a resistor 501. The emitter of transistor 499 is connected directly to a +24 volt source of potential and the collector output node 497 is connected to ground through a resistor 503. The base of transistor 499 is connected through a resistor 505 to a node 507. Node 507 is connected to the anode of a diode 509 whose cathode is connected directly to a +5 volt source of potential, and via lead 511 it is connected to input terminal 513.

Figure 10:
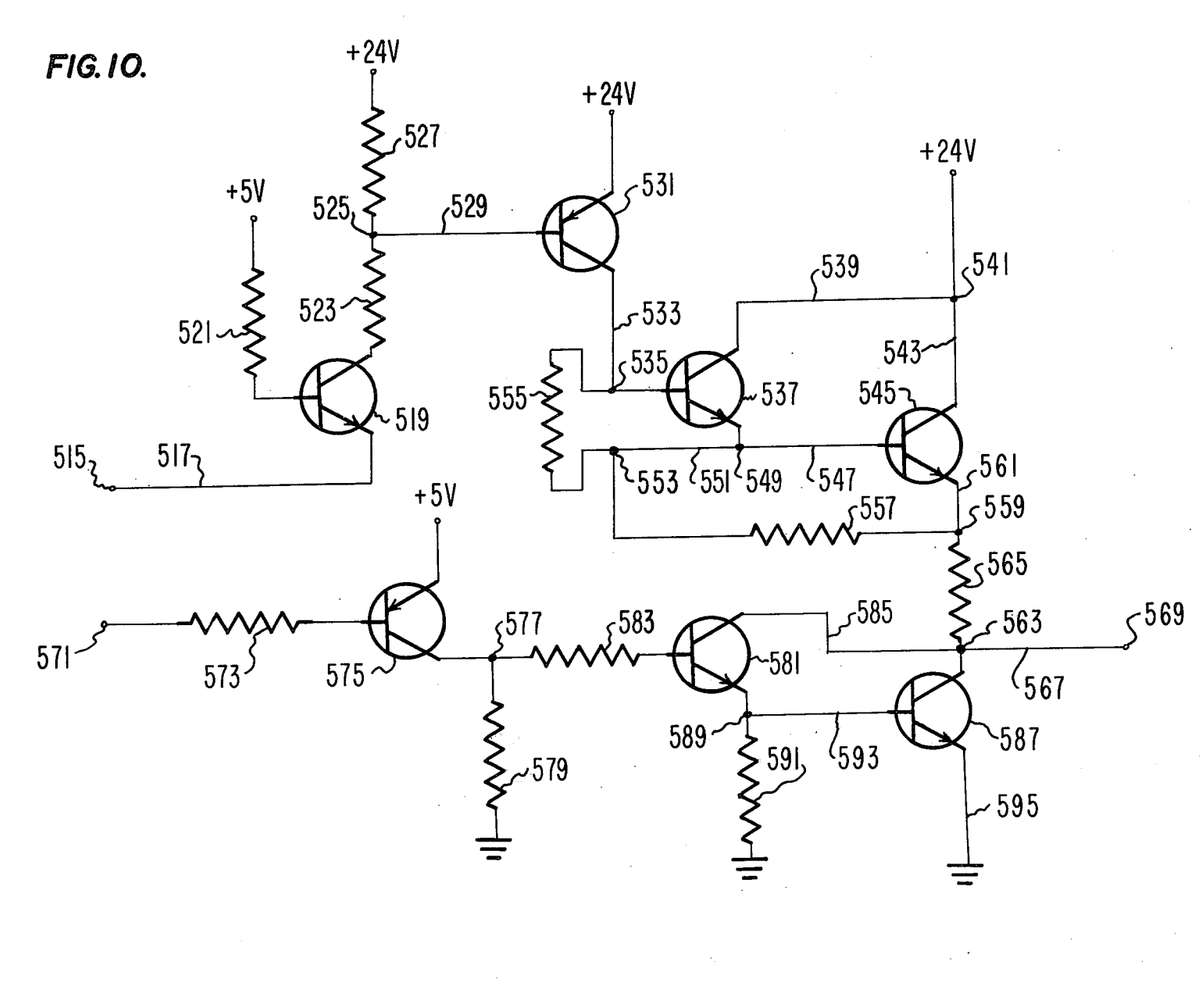
FIG. 10 is a schematic diagram of the braking driver of block 135 of FIG. 5.

The remainder of the drive circuit of the present invention is illustrated in FIG. 10 which shows a schematic diagram of the braking driver circuitry of block 135 of FIG. 5. Input terminal 515 is connected via lead 517 to the emitter of a transistor 519. The base of transistor 519 is connected through a resistor 521 to a +5 volt source of potential, and the collector is coupled through a resistor 523 to a collector output node 525. Node 525 is coupled through a resistor 527 to the +24 volt source of potential and via lead 529 directly to the base of a transistor 531. The emitter of transistor 531 is coupled directly to a +24 volt source of potential and the collector is coupled via lead 533 to a node 535. Node 535 is connected directly to the base of a fifth drive transistor 537. The collector of transistor 537 is coupled via lead 539 to a node 541 and node 541 is coupled directly to a +24 volt source of potential and via lead 543 to the collector of a sixth drive transistor 545. The base of transistor 545 is connected via lead 547 to the emitter of transistor 537 at emitter output node 549. Emitter output node 549 is coupled via lead 551 to node 553 and node 553 is coupled through a resistor 555 to node 535 and through a resistor 557 to an emitter output node 559. The emitter output node 559 is connected directly to the emitter of transistor 545 via lead 561 and is connected to the third drive output node 563 through a resistor 565. The third drive current output node 563 is connected through a lead 567 to a third current drive output terminal 569. Input 571 is connected through a resistor 573 to the base of a transistor 575 whose emitter is coupled directly to a +5 volt source of potential. The collector of transistor 575 is connected directly to a node 577. Node 577 is connected to ground through resistor 579 and to the base of a third grounding transistor 581 through a resistor 583. The collector of transistor 581 is connected via lead 585 to the output node 563 which is also connected directly to the collector of a fourth grounding transistor 587. The emitter of transistor 581 is connected directly to an emitter output node 589 which in turn is connected to ground through a resistor 591 and to the base of transistor 587 via lead 593; while the emitter of transistor 587 is connected directly to ground via lead 595.

The operation of the drive circuitry of FIGS. 9 and 10 is well-known in the art and does not form the basis of the present invention. It will be readily apparent that while a high speed drive signal is present at terminal 263, the forward drivers comprising transistors 431, 435, 439, 447 will supply a high voltage positive drive signal at the first driver output terminal 461, the signal on driver input terminal 571 will insure that the transistors 581 and 487 remain grounded thereby grounding the second driver terminal 569 and insuring that the motor moves in the forward direction. When braking is to occur, the polarity of the signal at drive terminals 461 and 569 must be reversed and this is accomplished by driving transistors 487 and 489 so as to drive the first drive terminal 461 to ground while activating transistors 537 and 545 to cause terminal 569 to exhibit a positive drive signal. When the low speed detector circuit of FIG. 7 detects that the velocity has fallen between the predetermined value, reverse drive is teminated and the motor is stopped, as known in the art. The encoder can then await the arrival of the next document before reinitiating the encoder drive cycle.

Figure 11:
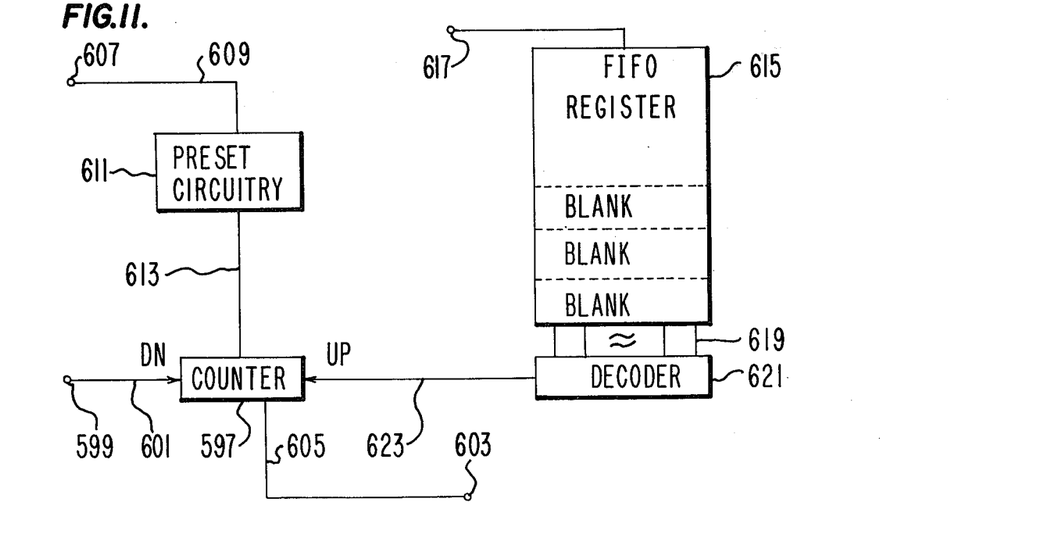
FIG. 11 is a block diagram of additional circuitry which may be used to implement the slew feature of the present invention.

FIG. 11 shows a block diagram of the additional circuitry which may be included within the control logic of block 117 to effectuate the second and third embodiments of the present invention wherein the automatic slew feature is included. In the slew mode, the encoder would either start from a stop position and rapidly accelerate to a high speed or, in the alternative, enter on-the-fly at the high speed and be decelerated only as the encoder field position to be encoded with the first character is approached. Columns prior to that location would be skipped and counted down by the EMCLK pulse. The EMCLK pulses would be supplied to an up-down counter 597 via input terminal 599 and lead 601. When the number in the counter approaches some predetermined value at or near zero, the DC servo motor 91 will be braked to the normal encode speed and the document will be moved to the proper column as the up-down counter 597 is counted down to zero. Information as to the acutal count currently in the counter can be taken from terminal 603 via lead 605. The number of columns to be skipped down may be derived directly from the processor through software or the like and supplied via terminal 607 and lead 609 to the preset circuitry of block 611 which, as known in the art, can be used to preset a predetermined initial count into the counter 597 via preset path 613. In the alternative, the number of columns to be stepped down could be derived from a first-in, first-out, (FIFO) register 615 which receives, in a character by character manner, the sequence of characters which are to be printed on the document. These characters are supplied to terminal 617 and entered into the FIFO register, as known in the art. As each character is stepped out of the FIFO register via lead 619 and under the control of some clocking means, perhaps EMCLK, each blank character which represents a particular column which is not to receive an encoded character would be recognized by the decoder of block 621 causing the up-down counter of block 597 to be up-counted via lead 623. Time delay means could be used so that when the first character to be encoded is decoded via block 621, the counter will generate a signal at output terminal 603 and cause the servo motor 91 to decelerate to the normal encoding speed $V_{ls}$ as described previously.

The overall operations of the individual circuits of FIGS. 6–11 are relatively standard and the overall operation of these circuits is that they contribute to the operation of the present invention as was described with reference to the block diagram of FIG. 5. Although specific apparatus has been shown for the purpose of describing applicant's invention, it will be apparent to those skilled in the art that other variations and modificatons in the specific structure illustrated may be made without departing from the spirit and scope of the present invention which is limited only by the appended claims.

What is claimed is:

1. A system for driving a document through an encoder apparatus having means for generating signals indicative of the characters to be encoded at predetermined character positions on said document and having an encoder station therein for printing said characters at said predetermined character positions, said document drive system comprising:

first drive means for transporting said document at a first relatively high predetermined document transport speed into and out of said encoder apparatus;

second drive means within said encoder apparatus for receiving said document from said first drive means and driving said document past said encoder station and toward said first drive means which again receives and exits said document from said encoder apparatus; and means for controlling the operation of said second drive means for increasing the throughput of said encoder apparatus, said control means including:

means at the input of said encoder apparatus for receiving said document from said first drive means and for registering said document at a predetermined position as it enters said encoder apparatus;

means coupled to said second drive means for transporting said document from said predetermined position at the entrance of said encoder apparatus toward said encoder station and for driving at least that portion of said document having said predetermined character positions in which characters are to be encoded past said encoder station at a relatively constant, relatively slow predetermined encoding speed until the last character to be encoded on said document is printed thereon;

means for rapidly accelerating said document from said predetermined encoding speed toward said first relatively high predetermined document transport speed of said first drive means for exiting said document from said encoder apparatus when the last character to be encoded on said document has been printed thereon; and means responsive to the exit of said document from said encoder apparatus for restoring said second drive means to await the arrival of the next successive document at the input of said encoder apparatus for transporting said next successive document toward said encoder station.

2. The document drive system of claim 1 wherein said second drive means includes roller means for contacting and driving said documents within said encoder apparatus and a DC servo motor means for driving said roller means.

3. The document drive system of claim 2 wherein said means at the input of said encoder apparatus for receiving said document includes means for stopping and registering said document at said predetermined position as it enters said encoder apparatus; wherein said means for transporting said document from said predetermined positon toward said encoder station includes means for initially accelerating said document from said stopped position to said relatively constant predetermined encoding speed; and wherein said control means further includes means for monitoring the speed and position of said document relative to said encoder station and means for maintaining said predetermined encoding speed relatively constant until the last character to be encoded on said document has been printed thereon.

4. The document drive system of claim 3 wherein said control means further includes means responsive to the exit of said document from said encoder apparatus for electrically braking said DC servo motor means to a stopped position to enable said document receiving means to await the arrival of the next successive document at the input of said encoder apparatus.

5. The document drive system of claim 4 wherein said means for monitoring the speed and position of said document includes a slotted disk coupled to said DC servo motor means, photoelectric means associated with said slotted disk for generating electrical timing pulses indicative of the actual speed of said DC servo motor means, and means for shaping said electrical timing pulses; and wherein said means for maintaining said predetermined encoding speed relatively constant includes means for generating a reference signal indicative of the nature of the characters being encoded on said document and the desired speed necessary for the proper spacing of said characters, a frequency/phaase discriminator circuit means for establishing a phase-locked loop for comparing the actual speed with the desired speed and for generating a signal indicative thereof, means for supplying said reference signal to said frequency/phase discriminator circuit means, means for supplying said shaped electrical timing pulses to said frequency/phase discriminator circuit means, and means for coupling the output of said frequency/phase discriminator means to said second drive means for varying the current supplied to said DC servo motor means to maintain said relatively constant predetermined document encoding speed.

6. The document drive system of claim 4 wherein said means for electrically braking said second drive means includes means for generating a signal indicative of the exit of said document from said encoder apparatus; means for electrically reversing the current supplied to said DC servo motor means for electrically braking said motor means by attempting to drive it in the opposite direction; and means responsive to said shaped electrical timing pulses for sensing when said motor speed has reached a predetermined low speed for removing the drive current from said DC servo motor means before said DC servo motor means actually begins to run in the opposite direction thereby allowing said DC servo motor means to come to said stopped position.

7. The document drive system of claim 2 wherein said means at the input of said encoder apparatus for receiving said document includes means for stopping and registering said document at said predetermined position as it enters said encoder apparatus;
- wherein said control means further includes means for generating a signal indicative of the first character position on said document in which a character is to be encoded, means for monitoring the speed and position of said document with respect to said encoder station, and means for determining when particular character positions on said document are at a predetermined distance from said encoder station; and
- wherein said means for transporting said document from said predetermined registration position toward said encoder station includes:
  - means for rapidly accelerating said document from said stopped position and responsive to said determining means for continuing to accelerate said document until said first character position in which a character is to be encoded is a predetermined distance from said encoder station;
  - means responsive to a determination that said first character position in which a character is to be encoded is said predetermind distance away from said encoder station for decelerating said document until a relatively low predetermined encoding speed has been attained; and
  - phase-locked loop circuit means resonsive to said document speed having been decelerated to said predetermined encoding speed for maintaining said predetermined encoding speed relatively constant until the last character to be encoded on said document has been printed thereon.

8. The document drive system of claim 7 wherein said decelerating means further included means responsive to the exit of said document from said encoder apparatus for reversing the current supplied to said DC servo motor means and electrically braking said DC servo motor means to a stopped position to enable said document receiving means to await the arrival of the next successive document at the input of said encoder apparatus.

9. The document drive system of claim 8 wherein said means for monitoring the speed and position of said document with respect to said encoder station includes a slotted disk coupled to said DC servo motor means for rotation therewith, and photoelectric means associated with said slotted disk for generating electrical timing pulses indicative of the actual speed of said DC servo motor means;
- wherein said phase-locked loop circuit means includes means for generating a reference signal indicative of the desired speed necessary for the proper spacing of said characters to be encoded on said document, a frequency/phase discriminator circuit means for comparing the actual speed of said DC servo motor with said desired speed and for generating an output control signal indicative thereof, means for supplying said reference signal to said frequency/phase discriminator circuit means, means for supplying said electrical timing pulses indicative of the actual speed of said DC servo motor means to said frequency/phase discriminator circuit means, and means responsive to said output control signal for controlling said second drive means for varying the current supplied to said DC servo motor means to maintain said predetermined document encoding speed relatively constant.

10. The document drive system of claim 9 wherein said means for electrically braking said DC servo motor means includes means for generating a signal indicative of the exit of said document from said encoder apparatus;
- means for electrically reversing the current supplied to said DC servo motor means for electrically braking said motor by attempting to drive it in the opposite direction; and
- means responsive to said electrical timing pulses for sensing when said motor speed has reached a predetermined low speed for removing the drive current from said DC servo motor means before said DC servo motor means actually begins to run in the opposite direction thereby allowing said DC servo motor means to come to said stopped position; and
- wherein said control means further includes means responsive to the exit of said document from said encoder apparatus for disabling said phase-locked loop circuit means to allow said electrical braking means to decelerate said DC servo motor to said predetermind low speed for stopping said DC servo motor.

11. The document drive system of claim 2 wherein said means at the input of said encoder means for receiving said document includes means for receiving said document on-the-fly from said first drive means and for registering said document at said predetermined positiion as it enters said encoder apparatus;
- wherein said control means further includes means for generating a signal indicative of the first character position on said document in which a character is to be encoded, means for monitoring the speed and position of said document with respect to said encoder station, and means for determiniing when said first character position is a predetermined distance from said encoder station; and
- wherein said means for transporting said document from said predetermined registration position toward said encoder station includes means responsive to a determination that said fist character position in which a character is to be encoded is said predetermind distance away from said encoder station for decelerating said document until a relatively low predetermined encoding speed has been attained, and phase-locked loop circuit means responsive to said document having been decelerated to said predetermined encoding speed for maintaining said predetermined encoding speed relatively constant until the last character to be encoded on said document has been printed thereon.

12. The document drive system of claim 11 wherein said means responsive to the exit of said document from said encoder apparartus for restoring said second drive means to await the arrival of the next successive document at the input of said encoder apparatus includes means for sensing the actual speed of said document and for generating signals indicative thereof, and logic means responsive to said signals indicatvie of the actual speed of said document for determining when said document has been accelerated to said first relatively high predetermined document transport speed thereby enabling said second drive means to await the arrival of the next successive document at the input of said encoder apparatus for receiving said document on-the-fly from said first drive means at said first relatively high predetermined document transport speed.

13. The document drive system of claim 12 wherein said means for decelerating said document until a relatively low predetermined encoding speed has been attained includes means for generating a deceleration initiation signal when said first character position in which a character is to be encoded is said predetermined distance away from said encoder station, means responsive to said deceleration initiation signal for reversing the supply of drive current to said DC servo motor for electrically braking said motor by attempting to drive it in the opposite direction thereby decelerating said document until said relatively low predetermined encoding speed has been attained, and means responsive to the attainment of said relatively low predetermined encoding speed for enabling said phase-locked loop circuit means to assume the speed control of said DC servo motor until the last character to be encoded on said document has been printed thereon.

14. A document encoding system comprising:
means for encoding characters on a document;
drive means for driving said document into and out of said encoding means;
means for transporting said document at a relatively high document transport speed into and out of said drive means;
means for monitoring the location of particular encoding positions on said document with respect to said encoding means;
means responsive to said monitoring means and to information as to the characters to be encoded in the various encoding positions on said document for enabling said encoding means to print a desired character in its proper encoding position on said document; and
control means for controlling said drive means to drive said document by said encoding means at a relatively slow encoding speed while said characters are being encoded on said document and for driving said document by said encoding means at a mediate speed, greater than said relatively low speed, prior to the start of encoding and after the encoding operation is completed thereby increasing the throughput of said document encoder system.

15. The document encoder system of claim 14 wherein said control means further comprises:

means for stopping and registering said document prior to engagement by said drive means;
means responsive to the registration of said document for enabling said drive means to accelerate said document toward said encoding means at said mediate speed;
means responsive to the first encoding position on said document in which a character is to be encoded being a predetermined distance from said encoding means for decelerating said document;
means for selecting a first value of said relatively low encoding speed that corresponds to the encoding of MICR characters on said document and for selecting a second value of said relatively low encoding speed that corresponds to the encoding of OCR characters on said document;
means responsive to said selected value of said relatively low encoding speeds for establishing and maintaining said speed until all of the desired characters have been encoded on said document;
means for accelerating said document to said relatively high transport speed for exiting said document from said encoding means; and
means for electrically braking said drive means to a stop position to await the arrival of the next document at the input of said encoder station.

16. The document encoder system of claim 14 wherein said control means further comprises:
means for enabling said document to enter said encoding means at said relatively high transport speed;
means responsive to the first encoding position which is to be encoded on said document being a predetermined distance from said encoding means for decelerating said document;
means for selecting a first value of said relatively low encoding speed that corresponds to the encoding of MICR characters on said document and for selecting a second value of said relatively low encoding speed that corresponds to the encoding of OCR characters on said document;
means responsive to said selecting means for establishing and maintaining said relatively low encoding speed while said document is being encoded by said encoding means; and
means responsive the termination of encoding on said document for rapidly accelerating said document out of said encoding means for engagement by said transport means thereby increasing the throughput of said document encoder system.

* * * * *